Jan. 7, 1941.   I. M. LADDON ET AL   2,227,726
RETRACTABLE GUN MOUNT
Filed April 15, 1937   2 Sheets-Sheet 1
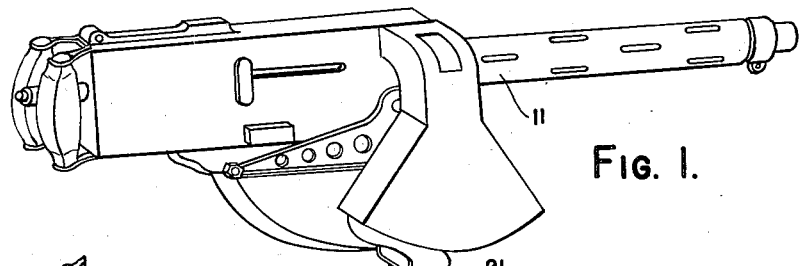
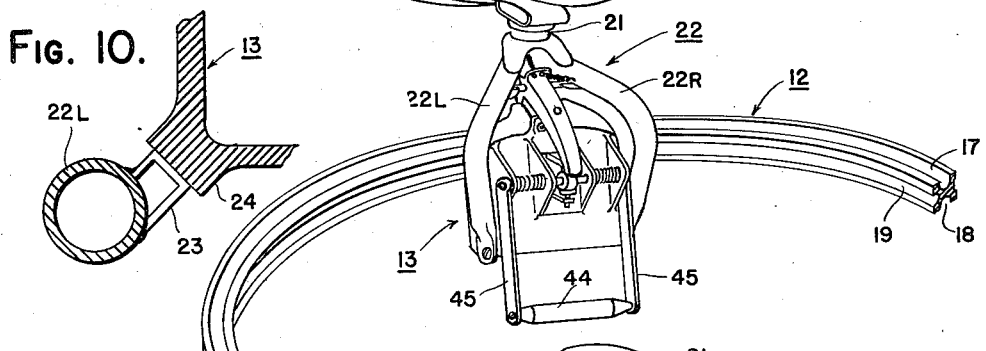
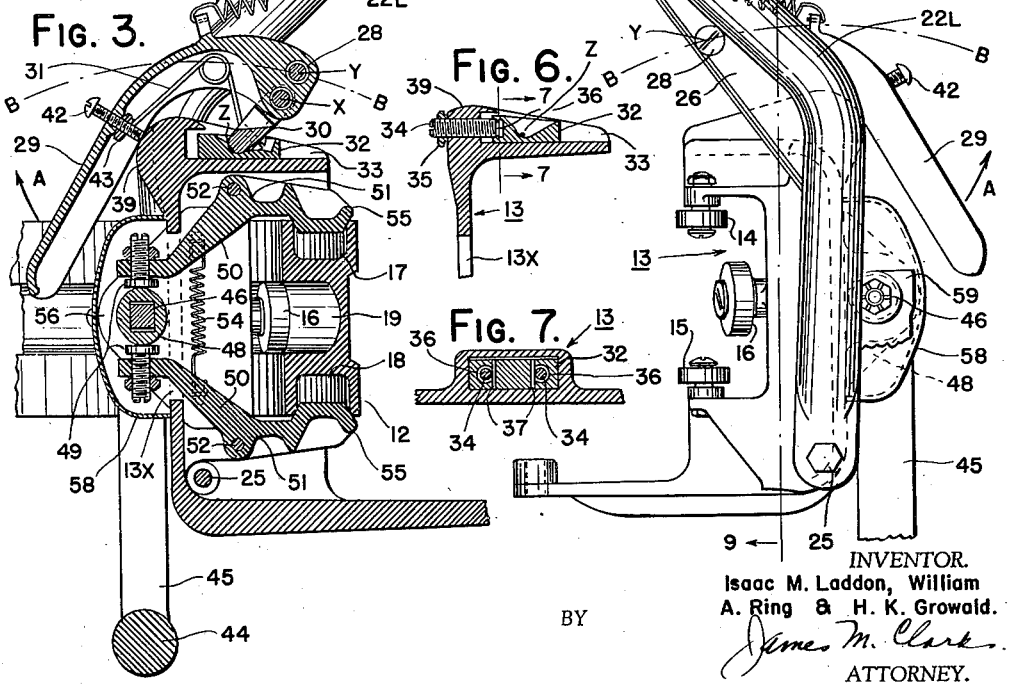
INVENTOR.
Isaac M. Laddon, William
A. Ring & H. K. Growald.
BY James M. Clark
ATTORNEY.

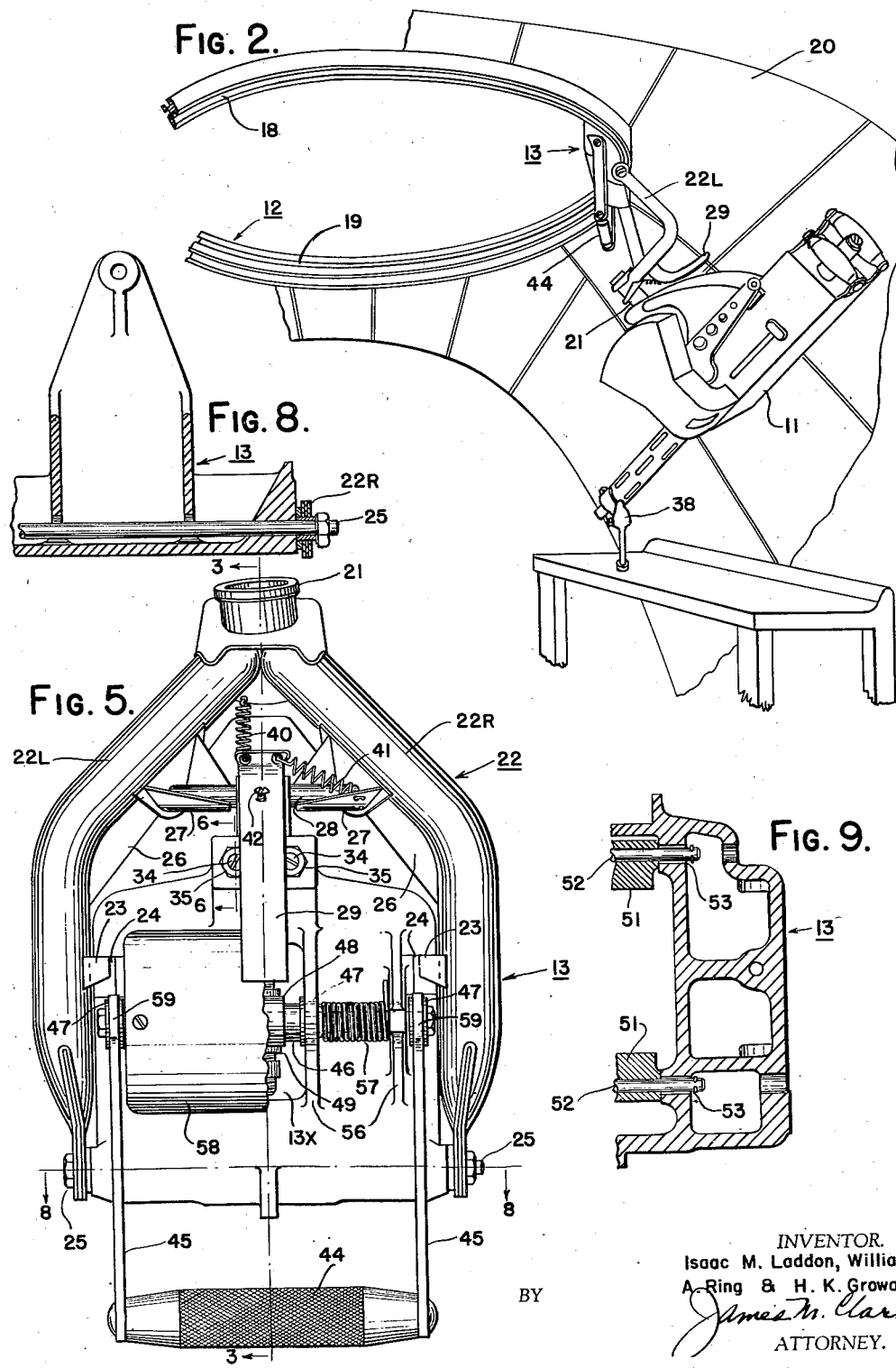

Patented Jan. 7, 1941

2,227,726

UNITED STATES PATENT OFFICE 2,227,726

RETRACTABLE GUN MOUNT

Isaac M. Laddon, William A. Ring, and Henry K. Growald, San Diego, Calif., assignors to Consolidated Aircraft Corporation, a corporation of Delaware Application April 15, 1937, Serial No. 136,952

5 Claims. (Cl. 89—37.5)

This invention relates to aircraft armaments and is more specifically concerned with flexible gun mounts of a retractable type suitable for use in military aircraft wherein the necessities of an extremely wide field of fire dictate a mounting of substantially universal maneuverability.

In general, a preferred embodiment of the invention comprises a circular metal track or ring of substantially quadrangular cross-section of which three of its external faces are formed with grooves adapted to receive the rollers of a channel shaped gun carriage which is thus capable of being moved with facility to any position on the track circumference, where it may be rigidly locked against further movement by depressing the hand grip by which the carriage was previously moved.

Also the carriage is provided with a pivoted stirrup which bears a socket member in which the gun adapter may be fastened. A toggle snap lock keeps the stirrup in operating position until deliberately released at which time the gun may be swung inwardly and downwardly into the gun pit.

Thus an object of this invention is the provision in a gun mount, of means adapting the gun for complete retractability within the aircraft skin into an out of the way position to allow the full use of the space beneath the mounting ring or track. Another object being the provision of such a retractable and stowable gun and mount which is particularly adapted for use in present day military aircraft having transparent hoods or closures designed to cover the cockpit for purposes of protection but which can be displaced to a non-interfering position when it is desired to enter or leave the cockpit or to operate the gun. In such cases, it is desirable to be able to fully retract the gun into the body so that these streamlined closures may not be interfered with by the gun or its mount or vice versa.

Other objects of the invention include a generally improved gun mounting carriage embodying various refinements for purposes of making the gun available instantaneously, even from its retracted position, through simplification of its control mechanism to the extent of utilizing but a single snap lever grip for locking or unlocking the retractable stirrup-like frame and by providing a second lever grip to accomplish traversing of the carriage on its track. A second function of this last mentioned lever grip is to release the friction stop means which normally hold the carriage at any desired point of its traverse and which makes it possible to traverse the gun to any one of an infinite number of positions as desired without stopping to select a definite latching point. Further, because of the overlapping positions of the foregoing levers at certain stations of their operating ranges it is practically impossible to retract the gun except when the gun carriage is locked in position on its rail, which factor is important to the safe operation of the gun. A further object of the invention being to permit retraction of the gun at any desired location on the track periphery.

With these and other objects in view, the invention consists of the novel construction and arrangement of parts as is more fully set forth and illustrated in the following description and accompanying drawings in which like numerals indicate like parts throughout and in which:

Fig. 1 shows a perspective view of the gun and its carriage mounted on its track in readiness for firing;

Fig. 2 is another perspective of the gun and carriage in retracted position as it might appear to an observer situated within the fuselage;

Fig. 3 is a cross sectional view of the carriage, taken on the line 3—3 of Fig. 5, showing its relation to the track and also the details of its locking mechanism;

Fig. 4 is a side elevation showing particularly the pivoted stirrup and several of the rollers by which the carriage is supported;

Fig. 5 is a full face view of the carriage;

Fig. 6 is a partial detail of the stirrup lock mechanism illustrating the adjustable toggle sled as taken on the line 6—6 of Fig. 5;

Fig. 7 is a further showing of the detail of Fig. 6 taken on the line 7—7 thereof;

Fig. 8 is a cross-sectional view showing the stirrup pivot taken at the line 8—8 of Fig. 5;

Fig. 9 is a partial cross-section of the carriage body along the line 9—9 of Fig. 4; and Fig. 10 is a fragmentary showing of the corner of the carriage body where a projection is formed to act as a stop for the stirrup in its extended position.

A machine gun, generally designated by the numeral 11, is movable over the entire periphery of a substantially circular track 12 by means of a readily traversable carriage 13 mounted on ball bearing rollers 14, 15 and 16 (of which there are two each) operating respectively in guideways 17, 18 and 19 cut into adjacent faces of the track member 12. This member 12 is set into the upper and outer section 20 of the airplane fuselage, as is well known in the art, through a suitable supporting connection to the structural framework thereof.

The gun 11 is mounted on the traversable carriage 13 through the agency of a universal pivot and its adapter, fitting into a socket member 21, as is also well known in the present state of the art. This socket 21 is borne by a pivoted stirrup 22 comprising the shaped tubular arms 22L and 22R which extend downward to the pivotal connection 25 on the lower portion of the carriage housing 13. As best shown in Figs. 5 and 10 the arms 22L and 22R are each provided with a welded-on projection or stop member 23 which engages similar projections 24 cast on each of the corners of the front face of housing 13 for the purpose of stopping the upward swing of stirrup 22L, 22R just before it assumes a vertical attitude. That is to say, the plane of the stirrup or yoke and its socket 21 are somewhat divergent from the vertical as seen in Fig. 4 to give the gun a cant to compensate for the effects of wind pressure. In addition the axis of socket 21 is slanted toward arm 22L for the same reason, as shown in Fig. 5, which design is desirable in a stirrup mounting a gun normally firing to rearward and to port of the aircraft. Such a refinement in design is practicable in large aircraft equipped with a number of guns, each having its own normal field of fire. Obviously for rearward firing in the starboard sector, preferably from another gunner's cockpit in the same aircraft, a gun in which the socket 21 was set with a slant towards the arm 22R, would be used.

The arms 22R and 22L are flattened at their lower extremities and pierced with a bore to pivotally mount on the bolt 25 extending transversely through the housing frame 13. However, each of the said arms is constructed with an integral web member 26 having inwardly extending cradles 27 which support a pivot rod 28 extending between the two webs 26, and on this rod 28, is a pivotally mounted locking arm 29 which carries a locking toggle 30 (Fig. 3) pivotally hung on the axis X and maintained in normal free position by spring 31 affixed thereto by a screw, as shown. The toggle 30 cooperates (in the locking position) with an adjustable concave member or sled 32 within a cutout portion 33 of the housing 13. This sled, as best shown in Figs. 5 and 6, is held in position by adjustable bolts 34 equipped with lock nuts 35 and each having a toroidal groove 36 cut into its shank near the tip in the sled member 32. The purpose of these grooves 36 is to provide a positive connection between the bolts 34 and the sled 32, these bolts being at the same time rotatable. Therefore pins 37 are inserted through the material of the sled 32 to engage the said grooves 36 and thus hold the elements 32 and 34 in fixed spatial relation to each other.

The lock member 29 is utilized to positively maintain the stirrup 22L—22R in its extended or operating position against the stops 24. On the other hand the stirrup may be unlocked and, together with the gun 11, swung inwardly and downwardly along the curved line B—B, through substantially more than 180 degrees, to a retracted position completely within the aircraft fuselage as shown in Fig. 2 where it may be held to one side by a suitable spring clip 38, out of the way of the occupants of the cockpit. In the retracted position the vertically projected space beneath the cockpit opening is entirely free for other purposes. If the lock arm 29 is pulled upward about pivot Y in the direction of arrow A, there first occurs a compression between the ball-ended toggle member 30 and sled 32 where the former fits into the ball shaped depression in the latter, at the contact point Z. This is due to the fact that pivot point X on toggle 30 lies slightly on one side of the straight line joining the points Y and Z, and because the movement of handle 29 about pivot Y tends to pivot the toggle 30 also at Z, thus bringing the point X on to the line Y—Z, after which it passes to the opposite side thereof, relieving the pressure and completing the unlocking operation. The toggle elements mentioned above are of substantially incompressible material and the adjustment therebetween is necessarily critical; hence the provision of the screws 34 for adjustable positioning of the sled 32 along the line of the axes of said screws 34. When the stirrup is unlocked and retracted along the arc B—B the toggle 30 has to clear the upper bulging portion 39 of housing 13, which it will readily do as it is pivoted at X and though normally held alined on the axis Y—Z the force of spring 31 is readily overcome. Also attached to lever 29 are springs 40 and 41 which attach to the stirrup arms 22L and 22R and which urge the lever 29 into a neutral position such that when the gun 11 and stirrup 22 are swung up in a normal position the lever 29 will follow in an attitude of readiness for depression into the locked position whereupon the toggle 30 and points X, Y, Z pass through a sequence of relationships, exactly opposite to those of the opening operation, which is terminated when the screw 42, adjustably set by lock nut 43, meets the housing portion 39, and when the point X has crossed the line Y—Z, the pressure at Z is relieved and the device is locked by the toggle effect against further movement.

The means of locking the gun carriage 13 at any desired point on its traverse, or of quickly releasing it for further movement, consists of a hand grip 44 suspended on a pair of arms 45 depending from a square shaft 46 provided with four spaced bushings 47 journaled in fins 56 cast integral with and projected from the front face of housing 13. Located centrally of the said shaft 46 is an elliptical cam 48 provided with diametrically opposed followers 49, adjustably held in converging arms 50 of two similar but opposedly mounted toggle locking members 51 which are pivoted on rods 52 in turn journaled in the housing frame 13, at 53 in Fig. 9. A spring 54 resiliently connects these opposed arms 50 and urges them together, thus forcing the followers 49 into intimate engagement with the face of cam 48. These arms 50 are part of a set of toggle levers 51 which extend through an opening 13X in the face of housing 13 to pivot centrally of their length at 52. The opposite ends 55, of toggles 51, are formed as a braking surface or grip to frictionally embrace the upper and lower surfaces of the track 12.

With the levers 45 in the down position, as shown in Figs. 3 and 5, the cam 48 presents substantially the major diameter of its face to the followers 49 so that they are spread apart and the jaw portions 55 tightly grip the track 12, but if the grip 44 is swung upward through 90 degrees, the cam 48 is rotated to present its face at a minor diameter thus allowing spring 54 to contract and force the jaw portions 55 apart, whereupon their grip on track 12 is released so that carriage 13 is readily movable therealong.

The cam 48 is arranged with respect to the shaft 46 and levers 45 in such a manner that when the latter are forced down to the locked position, the cam followers 49 pass over the major diameter of the cam face to a point just beyond the dead center, and at which the contractible force of spring 54 acts as a detent to keep the levers 45 in the locking position. On the shaft 46 and spaced to each side of cam 48 between supporting fins 56, are mounted coil springs 57 which assist the shaft 46 in its rotation and tend to hold it in the extreme position. This operating mechanism, including the spring 57 and cam 48, is preferably enclosed by a suitable dished cover 58.

When the grip 44 is swung rapidly upward rotation through more than the prescribed 90 degrees (in which case the operator's hands might have injurious contact with the toggle 29 or other parts of housing 13) is prevented by the cams 59 comprising projections on the levers 45, which in the raised or horizontal position of the levers come into contact with the adjacent portion of the housing 13. The operating mechanism is so designed that when the grip 44 is in the raised position just mentioned it interferes with normal access to the stirrup lock lever 29 and as a further result the gun 11 cannot be retracted except when the lever 45 with grip 44 are in the down position with the carriage 13 locked to the track 12 due to interference between the stirrup 22 and the lever 45. This is a safety feature of considerable importance.

The gun mount of this invention is peculiarly adapted for the service it is intended to perform since it is of a comparatively simple structure, is relatively light in weight and compact, is not likely to jam or otherwise get out of order, and may be controlled with one hand. It is especially suitable for use in patrol or observation types of aircraft wherein the gun operator may normally be occupied with other duties such as observation, photography, radio communication, etc. which because of the peculiar nature thereof require unobstructed use of the cockpit especially of the area immediately below and/or above the cockpit opening. With such service conditions the complete retractability of the herein described gun mount reaches its maximum usefulness and when an emergency suddenly arises the gun may be quickly swung upward and locked in readiness for firing in the shortest possible time.

To those skilled in the art it will be obvious that various changes may be made in the preferred construction disclosed herein and it is intended that all such changes or modifications be covered hereby to the full extent and scope of the appended claims.

What we claim is:

1. In a retractable gun mount for aircraft, locking mechanism for controlling retraction comprising an actuatable lever pivotally mounted on a movable part of said gun mount, a ball-ended toggle lever pivotally associated with said actuatable lever, a cooperating socket member positioned on a normally fixed part of said gun mount, spring means biasing said levers and means organized to adjustably position said socket member such that in the operating attitude of the gun mount, at which the ball-ended toggle engages the socket member, a partial rotation of the actuatable lever about its pivot will cause locking of the movable to the second part of the gun mount.

2. In an aircraft gun mount, a carriage track supported by the aircraft, a carriage traversable along said track, means for locking said carriage to said track comprising an actuatable lever, a shaft rotatable upon movement of said lever, a face cam mounted to rotate with the said shaft, a contact member adapted to bear upon said face cam, a unitary gripping member pivotally supported by said carriage and adjustably carrying said contact surface, and a gripping surface associated with said unitary gripping member for purposes of frictionally contacting said guide rail, gun retracting means comprising a stirrup pivoted at its lower extremity to the gun carriage and provided with mechanism for locking the stirrup to said carriage comprising a second actuatable lever pivotally associated with said stirrup, a ball-ended toggle lever pivotally hung from said second actuatable lever, and a cooperating socket member associated with said carriage whereby the said second lever is adapted to lock the stirrup to the carriage by toggle action of the toggle member against said socket, the said actuatable lever being so organized as to prevent the retraction of said stirrup when the lever is moved to its unlocked attitude.

3. In a gun mount of the type embodying a traversable carriage and a retractable gun support pivotally attached to said carriage, a releasable lock comprising a pivotally mounted hand lever, a ball-ended toggle, pivot means joining said lever and said toggle, spring means biasing said toggle to one position, a socket member adapted to be engaged by said toggle, and means to adjust said socket member with respect to said lever.

4. A releasable lock according to claim 3 in which, during movement of said hand lever, the toggle pivot moves from one side to the other of the straight line joining the point of pivotation of said hand lever and the point of contact between said toggle and said socket.

5. An aircraft gun mount including a guideway and a gun carriage traversable thereupon having a pivotally mounted gun-carrying stirrup of a substantially V-shape, means for fastening the said stirrup to said carriage including a hand lever pivotally supported on the arms of said V-shaped stirrup, second means for releasably locking said carriage to said track including a pivoted actuating lever mounted between the arms of said stirrup whereby, in its unlocked attitude, said hand lever will engage said actuating lever upon attempted retraction of said stirrup.

ISAAC M. LADDON.
WILLIAM A. RING.
HENRY K. GROWALD.